Oct. 30, 1923.

J. SHOWALTERBAUGH

DIRIGIBLE HEADLIGHT

Filed Sept. 11, 1922  2 Sheets-Sheet 2

1,472,141

Inventor
Joseph Showalterbaugh
By Philip A. Ferrell
Attorney

Patented Oct. 30, 1923.

1,472,141

UNITED STATES PATENT OFFICE.

JOSEPH SHOWALTERBAUGH, OF GARY, INDIANA, ASSIGNOR TO ALBION JOHN MILLER, OF HAMMOND, INDIANA.

DIRIGIBLE HEADLIGHT.

Application filed September 11, 1922. Serial No. 587,332.

*To all whom it may concern:*

Be it known that JOSEPH SHOWALTER-BAUGH, a citizen of the United States, residing at Gary, in the county of Lake and State of Indiana, has invented certain new and useful Improvements in Dirigible Headlights, of which the following is a specification, reference being had therein to the accompanying drawings.

The invention relates to dirigible headlights for motor driven vehicles, and has for its object to provide a device of this character wherein the headlight to the right or left of the vehicle, when the vehicle is making a turn to the right or left, will be turned and inclined downwardly whereby the rays of light will be directed on the ground immediately ahead of the vehicle, and the light which is not moved will project the light forwardly of the vehicle in the roadway.

A further object is to provide dirigible headlights for motor driven vehicles, said dirigible headlights comprisng lamp posts in the upper ends of which are pivotally mounted lamps, said lamps being mounted on ball bearing members, the race ways of which are inclined whereby the lamps, when partially rotated will incline forwardly and downwardly for projecting rays of light immediately ahead of the vehicle to the right or left, according to the direction of turn of the vehicle. The lamps are rotated by flexible shafts having their lower ends connected to rockable sleeves vertically disposed, which sleeves may be rocked in any suitable manner.

A further object is to provide spring means for returning the lamps to normal position and adjusting screw means for limiting the movement of the lamps in one direction.

A further object is to provide means whereby the lamp supporting ball raceways may be adjusted in relation to each other, and to provide tapered washers supporting the lamp bearing whereby said bearing may be adjusted at various angles.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 4 is a detail collective perspective view of the parts of the upper portion of one of the lamp posts.

Figure 5 is a horizontal sectional view through one of the lamp posts taken on line 5—5 of Figure 1.

Figure 1:
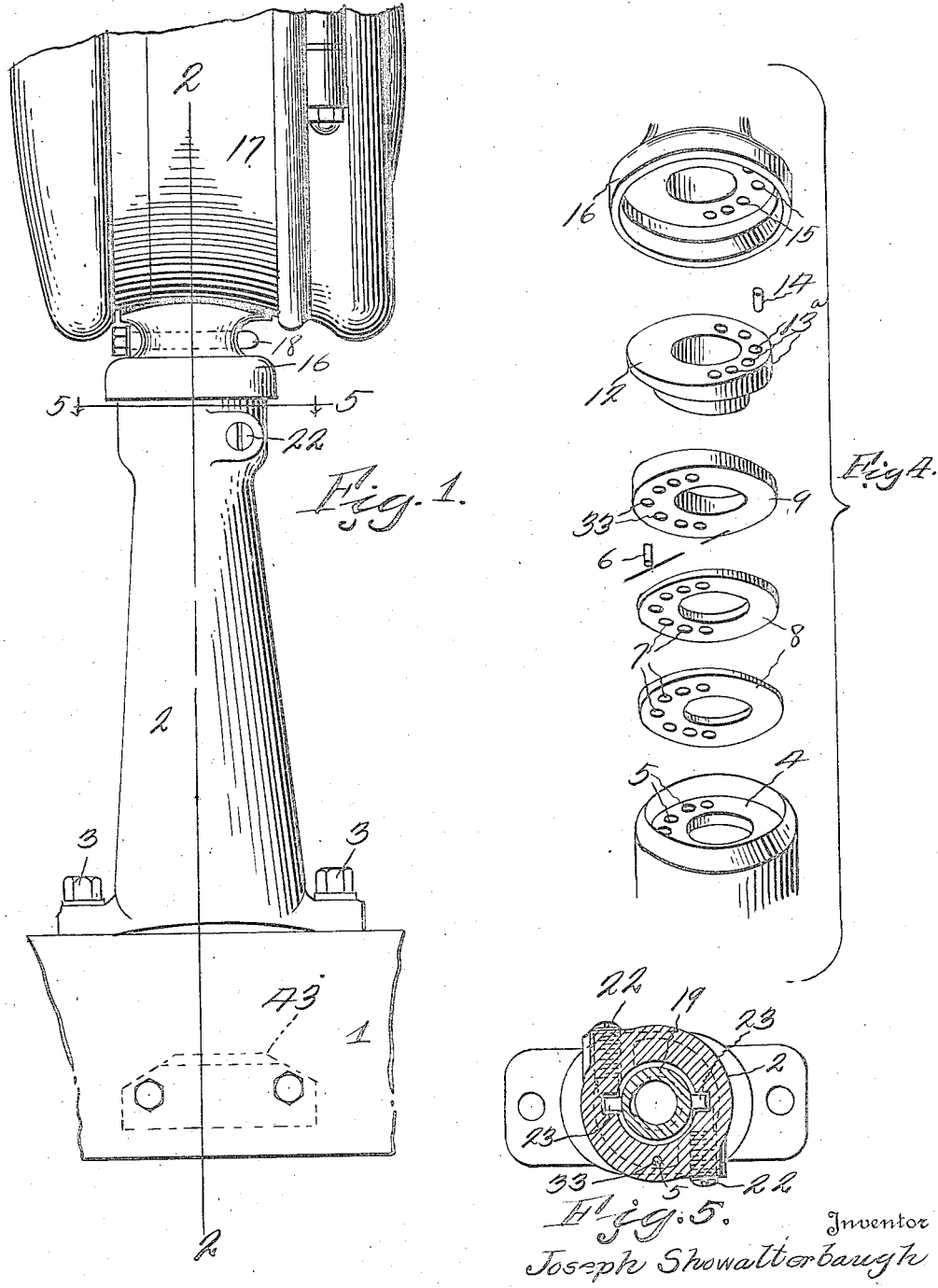
Figure 1 is a side elevation of the lights.
Figure 2:
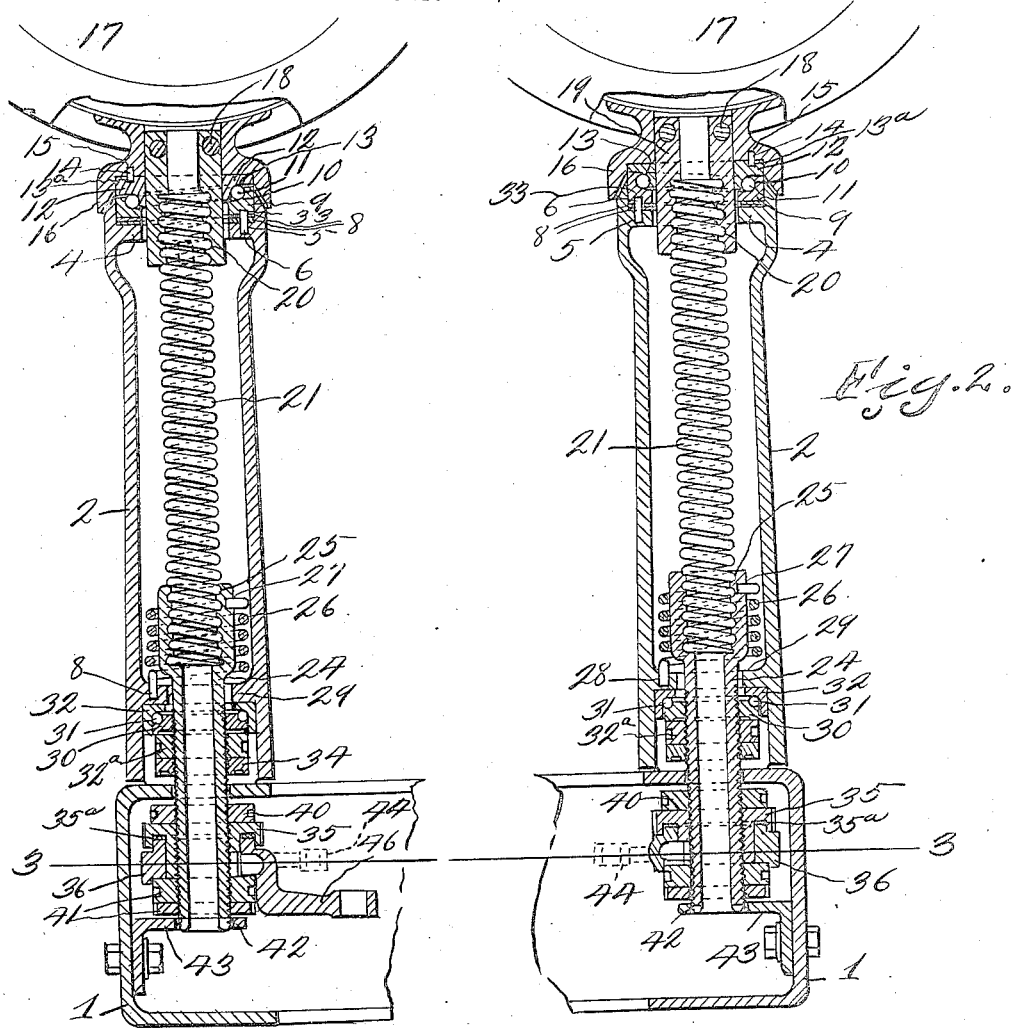
Figure 2 is a vertical transverse sectional view taken on line 2—2 of Figure 1.
Figure 3:
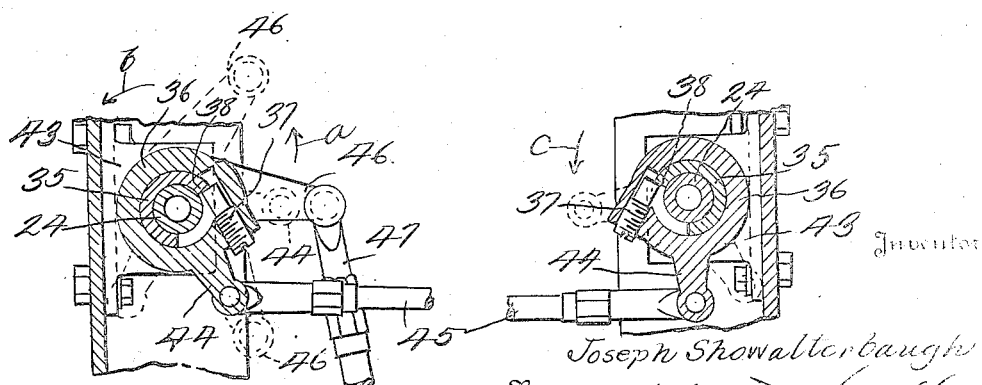
Figure 3 is a horizontal sectional view taken on line 3—3 of Figure 2.

Referring to the drawings, the numeral 1 designates the side rails of a conventional form of automobile frame, and 2 hollow lamp posts, which are secured to the rails 1 by means of bolts 3. Disposed within the posts 2 adjacent their upper end are horizontally disposed annular flanges 4, which flanges are provided with apertures 5, which receive pins 6. The pins 6 extend upwardly through apertures 7 in oppositely tapered washers 8, any one of which apertures may be placed in registration for varying the inclination of the upper surface of the upper washers. Disposed on top of the upper washers 8 are bearing members 9, the raceways 10 of which are inclined as clearly shown in Figure 2, and in which raceways ball bearings 11 are disposed. Disposed on the ball bearings 11 are bearing members 12, which bearing members have ball raceways 13, which are correspondingly and oppositely inclined to the raceways 10. It will be seen that when the bearing members 12 and 9 are rotated in relation to each other, that the upper surface of the members 12 will incline from a horizontal plane according to the direction of rotation of the members. The upper bearing members 12 are provided with apertures 13$^a$, which apertures receive pins 14, which pins are in turn received by any of the apertures 15 in the lamp carrying cap 16. By adjusting the bearing member 12, and tapered washers 8, and bearing member 9 on the pins 14 and 6 it is obvious that the lamps 17, which are carried by the caps 16 may be adjusted for normal inclination for projecting the rays of light on the roadway for a desired distance in front of the vehicle. Secured to the caps 16 by means of U-shaped bolts 18, which pass through the caps are downwardly extending sleeves 19, which sleeves extend through the bearing members 12 and 9, the washers 8 and through the annular flanges 4, and have secured in their lower ends at 20 the upper ends of flexible shafts 21, which shafts are formed from relatively strong coiled spring. Sleeves 19 are limited and adjusted in their rotation in one direction by means of adjusting screws 22, which are threaded in the posts 2 and engage opposite sides of lugs 23 carried by the sleeves 19. By referring to Figure 5 wherein this particular structure is clearly shown, it will be seen that the sleeves 19 which carry the lamps 17 may freely rotate in one direction, and when returned to normal inoperative position, are limited in their movement, so that the axis of the lamps will be in parallel relation to the longitudinal center line of the vehicle.

Rotatably mounted within the lower ends of the posts 2 are vertically disposed operating sleeves 24, in the upper ends of which are secured at 25 the lower ends of the flexible shafts 21. The retrograde movement of the sleeves 24, after an operation of the lamp by a partial rotation of the sleeves 24, is insured by coiled springs 26, which surround the upper ends of the sleeves 24 and have one of their ends anchored at 27 to the sleeves and their other end anchored at 28 to flanges 29 carried by the posts 2. The springs 26, under normal condition, maintain the lamps 17 in longitudinal position in relation to the vehicle, and the lugs 23 in engagement with the screws 22. The sleeves 24 have threaded thereon bearing members 30 in raceways of which ball bearings 31 are disposed, which ball bearings engage raceways of bearing members 32 disposed within the lower ends of the posts 2, and support the operating sleeves 24 in such a manner that friction is reduced to a minimum. Threaded on the sleeves 24 are adjusting nuts 32ª, which nuts may be adjusted upwardly and downwardly for adjusting the tension of the flexible shafts 21 for maintaining the caps in close engagement with the bearing member 12 and the pins 14 and 6 in position. The upper ends of the pins 6 engage in apertures 33 of the bearing member 9. The adjusting nut 32ª is held against movement by jam nut 34, thereby locking the same against retrograde movement after being adjusted.

Threaded on the lower ends of the operating sleeves 24 are operating bushings 35 and rockably mounted on the bushings 35 and movable in a horizontal plane are collars 36 into which are threaded stop pins 37, the inner ends of which engage shoulders 38 carried by the bushings 35, in such a manner whereby when either of the collars 36 are rotated in one direction, the bushings 35 and consequently the operating sleeves 24 will be rotated in the same direction, and when rotated in the opposite direction the operating sleeves 24 and the bushings 35 will not be operated or moved. However during the rotation of either bushing the other bushing is stationary and consequently only one lamp is moved. The bushings 35 are held against movement by the jam nuts 40, which engage their upper sides and which are threaded on the operating sleeves 24 and the collars 36 are held against axial movement by means of the lock nuts 41. The lower ends of operating sleeves 24 extend through apertures 42 in brackets 43 carried by the side rails of the vehicle frame and brace the same especially during severe shocks incident to the vehicle going over rough ground.

Extending outwardly from the collars 36 are arms 44, which arms are connected together by a connecting rod 45, whereby both collars 36 will be simultaneously moved upon the movement of the arm 46, to which the operating link 47 is connected, which operating link may be moved in any suitable manner, however preferably in connection with the steering mechanism of a vehicle. When the arm 46 is moved in the direction of the arrow $a$, the collar 36 will be moved in the direction of the arrow $b$ and consequently the end of the screw 37 will engage the shoulder 38 of the operating bushing 35 carried by the operating sleeve 24 and rotate said sleeve in the direction of the arrow $b$, thereby rotating the flexible shaft 21, the lamp supporting sleeve 19, which is mounted on the inclined bearing members 9 and 12, and consequently causing the lamp 17 to dip downwardly and outwardly to the left during the making of the turn to the left. During this operation the collar 36 of the other lamp post moves in the direction of the arrow $c$ and consequently is not moved in a direction whereby the adjacent operating sleeve 24 will not be rotated, therefore the light from the adjacent lamp will be reflected on the road bed in the usual manner. When the vehicle makes a turn to the right, the right lamp posts operates and the left remains idle.

From the above it will be seen that a dirigible headlight mechanism is provided, which is simple in construction, positive in its operation and one wherein the inclination of either light may be adjusted and the light dipped or inclined downwardly forwardly and moved outwardly according to the direction of turn of the vehicle thereby securing the maximum safety when making turns, and at the same time illuminating the road bed ahead of the vehicle by the light which is not operated.

Convexed spring washers 35ª are interposed between the bushings 35 and the collars 36, thereby preventing rattling of the parts and insuring close fitting of the parts.

The invention having been set forth what is claimed as new and useful is:—

1. A dirigible headlight mechanism for a motor driven vehicle, said mechanism comprising lamp posts located to the sides of the vehicle, shafts pivotally mounted in the upper ends of the posts, said shafts having attached thereto lamps, antifrictional bearings interposed between the shafts and the posts, said antifrictional bearings comprising oppositely tapered bearing members in engagement with each other, rockable vertically disposed sleeves rotatably mounted in bearings in the lower ends of the posts, means for rocking the sleeves according to the direction of turn of the vehicle, flexible shafts connecting the sleeves and the shafts disposed on the upper ends of the posts, adjusting means for limiting the movement of the shafts on the upper ends of the posts in one direction and spring means for normally maintaining the sleeves in normal position.

2. A dirigible headlight mechanism, said mechanism comprising hollow posts disposed to the sides of the vehicle, sleeves rotatably mounted in the lower ends of the posts, means for rotating the sleeves according to the direction of turn of the vehicle, lamp supporting members mounted on the upper ends of the posts, lamps carried by said members, oppositely tapered bearing members interposed between the lamp supporting members and the upper ends of the posts, means whereby said bearing members may be adjusted circumferentially in relation to each other, a flexible shaft connecting the lamp supporting members on the upper end of the sleeves, and spring means for normally maintaining the sleeves in normal position.

3. A dirigible headlight comprising a post, a sleeve vertically disposed and rotatably mounted in a bearing in the lower end of the post, means for rocking said sleeve, spring means for maintaining said sleeve in normal position, a lamp supporting member disposed on the upper end of the post, a lamp carried by said member, a flexible shaft connecting the lamp supporting member and the sleeve, beveled oppositely disposed bearing members interposed between the lamp supporting member and the post, pin and aperture means whereby said bearing members may be adjusted circumferentially in relation to each other and means whereby the tension on the flexible shaft may be varied.

4. A dirigible headlight comprising a hollow post, a rotatable sleeve mounted in a bearing in the lower end of the post, means whereby said sleeve may be rocked, spring means for normally maintaining the sleeve in normal position, a lamp disposed on the upper end of the sleeve, beveled bearing members oppositely disposed and interposed between the lamp and the post, and a coiled spring connected to the lamp and to the sleeve and forming a flexible shaft connection between the sleeve and the lamp.

In testimony whereof I hereunto affix my signature.

JOSEPH SHOWALTERBAUGH.